(12) United States Patent
Hollister (10) Patent No.: US 10,591,205 B2
(45) Date of Patent: Mar. 17, 2020

(54) COOLING SYSTEM WITH STIR-CYCLE

(71) Applicant: Heatcraft Refrigeration Products LLC, Stone Mountain, GA (US)

(72) Inventor: Michael Christopher Hollister, Atlanta, GA (US)

(73) Assignee: Heatcraft Refrigeration Products LLC, Stone Mountain, GA (US)

( * ) Notice: Subject to any disclaimer, the term of this patent is extended or adjusted under 35 U.S.C. 154(b) by 751 days.

(21) Appl. No.: 14/833,915

(22) Filed: Aug. 24, 2015

(65) Prior Publication Data

US 2017/0059239 A1 Mar. 2, 2017

(51) Int. Cl.
*F24F 11/74* (2018.01)
*F25D 29/00* (2006.01)
(Continued)

(52) U.S. Cl.
CPC .............. *F25D 29/00* (2013.01); *F24F 11/74* (2018.01); *F25D 17/062* (2013.01); *F25D 17/067* (2013.01); *F24F 7/06* (2013.01); *F24F 11/755* (2018.01); *F24F 11/77* (2018.01); *F25B 2313/0293* (2013.01); *F25B 2600/11* (2013.01); *F25B 2600/112* (2013.01);
(Continued)

(58) Field of Classification Search
CPC .............. F25B 2600/01; F25B 2600/23; F25B 2600/11; F25B 2600/112; F25B 2313/0293; F24F 7/06; F24F 11/74; F24F 11/75; F24F 11/77
USPC ......... 62/157, 186, 231, 404, 407, 408, 419, 62/426
See application file for complete search history.

(56) References Cited

U.S. PATENT DOCUMENTS 4,134,545 A * 1/1979 Westbrook ............... F24F 7/06
237/53
6,112,546 A 9/2000 Kim
(Continued)

FOREIGN PATENT DOCUMENTS

EP 1512921 3/2005
EP 2116798 11/2009
(Continued)

OTHER PUBLICATIONS

European Patent Office, Extended European Search Report issued for EP App. No. 16184233.1, dated Jan. 4, 2017.
(Continued)

*Primary Examiner* — Edward F Landrum
*Assistant Examiner* — Daniel C Comings
(74) *Attorney, Agent, or Firm* — Baker Botts L.L.P.

(57) ABSTRACT

A system includes a condensing unit, a valve, and a unit cooler. The condensing unit is configured to condense refrigerant. The valve is configured to control the flow of the refrigerant from the condensing unit to the unit cooler. The unit cooler is configured to operate in a refrigeration mode and a stir-cycle mode. The unit cooler is configured to operate at a first speed during the refrigeration mode and at a second speed for a first period of time and at a third speed for a second period of time during the stir-cycle mode. The second speed is slower than the first speed and the third speed is slower than the second speed. Electric power is supplied to the unit cooler throughout the refrigeration mode and the stir-cycle mode.

24 Claims, 4 Drawing Sheets

(51) Int. Cl.
*F25D 17/06* (2006.01)
*F24F 7/06* (2006.01)
*F24F 11/755* (2018.01)
*F24F 11/77* (2018.01)

(52) U.S. Cl.
CPC ...... *F25B 2600/23* (2013.01); *F25D 2600/04* (2013.01); *F25D 2700/12* (2013.01); *Y02B 30/743* (2013.01)

(56) References Cited

U.S. PATENT DOCUMENTS

| | | | | |
|---|---|---|---|---|
| 2009/0076658 | A1* | 3/2009 | Kinnis | ................. F24F 11/0001 700/277 |
| 2014/0096553 | A1 | 4/2014 | Satou et al. | |
| 2015/0338123 | A1* | 11/2015 | Iwano | .................... F24F 13/20 454/301 |

FOREIGN PATENT DOCUMENTS

| | | |
|---|---|---|
| JP | 55003503 | 1/1980 |
| JP | 63246496 | 10/1988 |
| JP | 03160264 | 7/1991 |

OTHER PUBLICATIONS

European Patent Office Action issued for EP App. No. 16184233.1, dated Oct. 18, 2017.

European Patent Office, Communication pursuant to Article 94(3) EPC, Application No. 16184233.1, dated Aug. 2, 2019, 5 pages.

\* cited by examiner

COOLING SYSTEM WITH STIR-CYCLE

TECHNICAL FIELD

This disclosure relates generally to a system for operating a motor and more specifically to a stir-cycle motor.

BACKGROUND

Refrigeration systems may be used to cool a space down to a set temperature. The refrigeration system may use refrigerant to remove heat from the air, and the refrigeration system may use a motor to turn a fan to circulate the cooled air. Running a motor at full speed at all times is inefficient and wastes energy. However, powering a motor on and off frequently reduces the lifespan of the motor.

SUMMARY OF THE DISCLOSURE

According to one embodiment, a system includes a condensing unit, a valve, and a unit cooler. The condensing unit is configured to condense refrigerant. The valve is configured to control the flow of the refrigerant from the condensing unit to the unit cooler. The unit cooler is configured to operate in a refrigeration mode and a stir-cycle mode. The unit cooler is configured to operate at a first speed during the refrigeration mode and at a second speed for a first period of time and at a third speed for a second period of time during the stir-cycle mode. The second speed is slower than the first speed and the third speed is slower than the second speed. Electric power is supplied to the unit cooler throughout the refrigeration mode and the stir-cycle mode.

According to another embodiment, an apparatus includes a fan and a motor assembly coupled to the fan. The motor assembly is configured to rotate the fan at a first speed during a refrigeration mode and to rotate the fan at a second speed for a first period of time and at a third speed for a second period of time during a stir-cycle mode. The second speed is slower than the first speed and the third speed is slower than the second speed. Electric power is supplied to the motor assembly throughout the refrigeration mode and the stir-cycle mode.

According to another embodiment, a method includes determining, by a processor, whether a motor should be operating in a refrigeration mode or a stir-cycle mode. The method further includes, in response to a determination that the motor should be operating in the refrigeration mode, operating the motor at a first speed and in response to a determination that the motor should be operating in the stir-cycle mode, operating the motor at a second speed for a first period of time and at a third speed for a second period of time. The second speed is slower than the first speed and the third speed is slower than the second speed. Electric power is supplied to the motor throughout the refrigeration mode and the stir-cycle mode.

Certain embodiments may provide one or more technical advantages. For example, an embodiment may preserve and/or increase the life of a motor by maintaining electric power to the motor during a refrigeration mode and during a stir-cycle mode. As another example, an embodiment may reduce the electric energy consumed by a motor by operating the motor in a stir-cycle mode. If the speed of the motor is cut in half during the stir-cycle mode compared to the speed of the motor during the refrigeration mode, and the duty cycle of the motor is 25% (e.g., on for 1 minute and off for 3 minutes) during the stir-cycle mode, then the energy reduction from the refrigeration mode to the stir-cycle mode may be 96.875%. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 4 of the drawings, like numerals being used for like and corresponding parts of the various drawings.

Refrigeration systems may be used to cool a space. Typical refrigeration systems have a duty cycle where the system turns on during a refrigeration cycle to cool the space and shuts off once the space reaches a set point temperature. The set point temperature may be set by a thermostat. During the refrigeration mode, the system may use refrigerant to remove heat from air, and a motor of the refrigeration system may turn a fan to circulate the cooled air throughout the space. However, when the refrigeration system is off, the motor will continue to turn the fan, sometimes at the same speed as during the refrigeration mode. Running the motor at full speed when the refrigeration system is off is not always necessary and may waste energy. To save energy, many refrigeration systems use two-speed motors that can turn the fan at a reduced speed when the refrigeration system is off. However, the motor still turns throughout the time the refrigeration system is off.

One way to reduce the energy consumed when the refrigeration system is off is to cut power to the motor. However, the air in the space should be circulated when the refrigeration system is off to prevent localized hot spots from forming. As a result, power may be cut and then re-applied to the motor periodically to circulate the air when the refrigeration system is off. Turning on and off the motor is known as a stir-cycle. However, powering the motor on and off may reduce the lifespan of the motor.

This disclosure contemplates a refrigeration system that operates in a refrigeration mode and a stir-cycle mode that may maintain and/or improve the lifespan of the motor. The refrigeration system may operate the motor at full speed during the refrigeration mode. Then during the stir-cycle mode, the refrigeration system may periodically operate the motor at reduced speeds without cutting power to the motor. The refrigeration system may include a switch that indicates whether the refrigeration system is in the refrigeration mode or the stir-cycle mode. The switch may switch the motor between refrigeration mode and stir-cycle mode without cutting power to the motor. The refrigeration system will be described in more detail using FIGS. 1 through 4.

Figure 1:
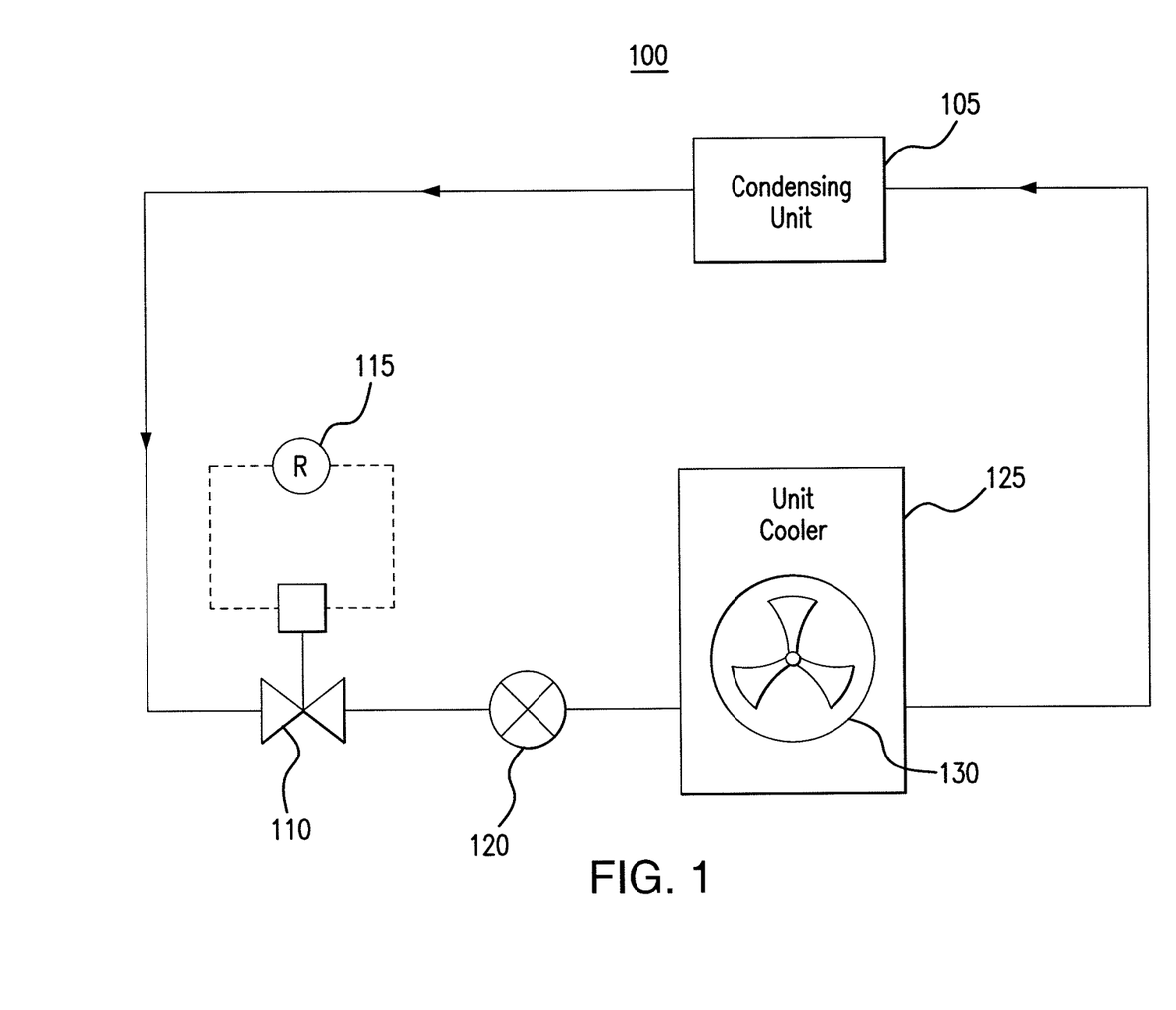
FIG. 1 illustrates an example refrigeration system.

FIG. 1 illustrates an example refrigeration system 100. As provided in FIG. 1, system 100 may include a condensing unit 105, a valve 110, a relay 115, a valve 120, and a unit cooler 125. System 100 may operate to cool a space. In particular embodiments, system 100 may operate in a refrigeration mode and a stir-cycle mode while maintaining electrical power to unit cooler 125.

During the refrigeration mode, condensing unit 105 may condense and/or circulate refrigerant to other components of system 100. In the illustrated example of FIG. 1, refrigerant may flow from condensing unit 105 to valve 110, valve 120, and unit cooler 125. The refrigerant may return to condensing unit 105 from unit cooler 125. The refrigerant may be used to cool air that is then circulated through the space by unit cooler 125.

Valve 110 may control the flow of the refrigerant through system 100. For example, valve 110 may control the flow of the refrigerant from condensing unit 105 to unit cooler 125. Valve 110 may be open or closed. In particular embodiments, valve 110 may be controlled by a thermostat. When the thermostat indicates that a temperature of the space is above a set point temperature, the thermostat may open valve 110 allowing refrigerant to flow to cool the air. On the other hand, when the thermostat indicates that a temperature of the space is less than or equal to the set point temperature, the thermostat may close valve 110, preventing refrigerant from flowing through system 100. In certain embodiments, valve 110 may be a liquid line solenoid valve. This disclosure contemplates valve 110 being any appropriate type of valve.

Relay 115 may control the mode of operation of system 100. For example, relay 115 may indicate whether system 100 should be operating in the refrigeration mode or the stir-cycle mode. In certain embodiments, relay 115 may be controlled by the thermostat. When the thermostat indicates that a temperature of the space is above a set point temperature, the thermostat may cause relay 115 to switch, open, and/or close to indicate that system 100 should be operating in the refrigeration mode. On the other hand, when the thermostat indicates that a temperature of the space is less than or equal to a set point temperature, the thermostat may cause relay 115 to switch, open, and/or close to indicate that system 100 should be operating in the stir-cycle mode. In certain embodiments, the thermostat may open and/or close valve 110 based on the temperature of the space. Relay 115 may detect the state of valve 110 and control the mode of operation of system 100 based on the state of valve 110. For example, relay 115 may indicate that system 100 should operate in refrigeration mode when valve 110 is open and that system 100 should operate in stir-cycle mode when valve 110 is closed.

Relay 115 may be electrically coupled to unit cooler 125. Relay 115 may indicate to unit cooler 125 whether system 100 is operating in the refrigeration mode or the stir-cycle mode. Unit cooler 125 may change its operation based on whether relay 115 indicates that system 100 should be operating in the refrigeration mode or the stir-cycle mode. This disclosure contemplates system 100 including any appropriate number of relays 115. This disclosure further contemplates relay 115 being any appropriate switch such as, for example, a mechanical switch and/or an electrical switch that can indicate the mode of operation of system 100.

Valve 120 may expand the refrigerant before it reaches unit cooler 125. In particular embodiments, valve 120 may be an expansion valve. By expanding the refrigerant, the refrigerant may change from a liquid state to a liquid and gaseous state. The refrigerant may then be used to cool air in the space. This disclosure contemplates valve 120 being any appropriate type of expansion valve.

Unit cooler 125 may circulate cooled air throughout the space. As provided in the example of FIG. 1, unit cooler 125 may include a fan 130. Unit cooler 125 may circulate air through the space by turning fan 130. During the refrigeration mode, unit cooler 125 may rotate fan 130 at a first speed, such as for example, 1600 rotations per minute. In certain embodiments, the first speed may be the full and/or max speed of unit cooler 125. By turning fan 130 at the full speed, unit cooler 125 may quickly circulate cooled air throughout the space. During the stir-cycle mode, unit cooler 125 may periodically alternate the speed of fan 130. For example, unit cooler 125 may alternate the speed of fan 130 between a second speed, such as for example 800 rotations per minute, and a third speed, such as for example 0 rotations per minute. The third speed may be slower than the second speed and the second speed may be slower than the first speed. Unit cooler 125 may rotate fan 130 at the second speed for a first period of time, such as for example 1 minute, and then rotate fan 130 at the third speed for a second period of time, such as for example 3 minutes. The first period of time and the second period of time may be different or the same. By using relay 115, unit cooler 125 may operate fan 130 at zero rotations per minute without power to unit cooler 125 being cut.

By using the stir-cycle, unit cooler 125 may reduce the energy usage of system 100. Energy usage will fall by the reduction of the speed of fan 130 cubed. Energy usage will also fall as the duty cycle is reduced. For example, if the speed of fan 130 is cut in half during the stir-cycle mode compared to the speed of fan 130 during the refrigeration mode, and the duty cycle of fan 130 is 25% (e.g., on for 1 minute and off for 3 minutes), then the energy reduction from the refrigeration mode to the stir-cycle mode may be 96.875%. Furthermore, by maintaining electric power to unit cooler 125 during the refrigeration mode and the stir-cycle mode, the lifespan of unit cooler 125 or a motor of unit cooler 125 may be preserved, maintained, or increased in particular embodiments. When power to unit cooler 125 is periodically cut off and then reapplied, the lifespan of unit cooler 125 and/or a motor of unit cooler 125 may be reduced.

In operation, system 100 may circulate air to cool a space. System 100 may operate in at least a refrigeration mode and a stir-cycle mode. System 100 may operate in the stir-cycle mode without cutting electric power to unit cooler 125.

A thermostat of system 100 may be set to a particular temperature. The thermostat may measure a temperature of the space and compare it against the set temperature. When the measured temperature is greater than the set temperature, the thermostat may indicate that system 100 should operate in the refrigeration mode. When the measured temperature is less than or equal to the set temperature, the thermostat may indicate that system 100 should operate in the stir-cycle mode. This disclosure further contemplates the thermostat indicating that system 100 should operate in the refrigeration mode rather than the stir-cycle mode when the measured temperature is equal to the set temperature.

When the thermostat determines that a measured temperature of the space is greater than or equal to the set temperature, the thermostat may indicate that system 100 should operate in the refrigeration mode. The thermostat may then open valve 110, which allows refrigerant to flow through system 100 and to remove heat from the air. Condensing unit 105 may circulate refrigerant through valve 110 and valve 120. The refrigerant may flow to unit cooler 125 and may cool the air in or around unit cooler 125. The refrigerant may then flow back to condensing unit 105 to be condensed.

The thermostat may also switch, open, and/or close relay 115 to indicate to unit cooler 125 that it should operate in the refrigeration mode. When unit cooler 125 determines that it should be operating in the refrigeration mode, unit cooler 125 may rotate fan 130 at a first speed, such as for example 1600 rotations per minute. In particular embodiments, unit cooler 125 may rotate fan 130 at a maximum and/or full speed during the refrigeration mode. In this manner, unit cooler 125 may quickly circulate cooled air throughout the space to cool the space down to the set temperature. This disclosure contemplates unit cooler 125 operating at any appropriate speed during the refrigeration mode.

When the thermostat detects that a measured temperature of the space is less than or equal to the set temperature, the thermostat may indicate that system 100 should operate in the stir-cycle mode. The thermostat may close valve 110 so that refrigerant does not flow through system 100. The thermostat may further switch, open, and/or close relay 115 to indicate that system 100 should operate in the stir-cycle mode.

Unit cooler 125 may determine based on relay 115 that unit cooler 125 should operate in the stir-cycle mode. In response, unit cooler 125 may begin alternating the speed of fan 130 between two speeds. In particular embodiments, one of the speeds may be 800 rotations per minute and the other speed may be 0 rotations per minute. Unit cooler 125 may rotate fan 130 at a first speed for a first period of time such as, for example, one minute and then unit cooler 125 may rotate fan 130 at the second speed for a second period of time such as, for example, three minutes. In this manner, unit cooler 125 may periodically circulate air within the space during the stir-cycle mode to reduce the formation of localized hot spots within the space. This disclosure contemplates unit cooler 125 rotating fan 130 at any appropriate speeds for any appropriate periods of time during the stir-cycle mode. This disclosure further contemplates unit cooler 125 rotating fan 130 at any appropriate number of speeds during the stir-cycle mode. For example, unit cooler 125 may rotate fan 130 at three different speeds for three periods of time during the stir-cycle mode.

In particular embodiments, the unit cooler may include an interface that can receive input that changes the operational speed and duty cycles of unit cooler 125. For example, unit cooler 125 may include dials, jumper slots, and any other appropriate interfaces that can be used to adjust the speed and duty cycle of unit cooler 125. As another example, the interface may include variable resistors, time delay relays, and other appropriate analog circuitry that may adjust the speed and duty cycle of unit cooler 125. The interface may be used to change how fast unit cooler 125 rotates fan 130 during the refrigeration mode and during the stir-cycle mode. The interface may be used to change the period of time at which unit cooler 125 rotates fan 130 at a first speed during the stir-cycle mode and the period of time at which unit cooler 125 rotates fan 130 at a second speed during the stir-cycle mode.

Because unit cooler 125 may periodically stop rotating fan 130 during the stir-cycle mode, operating unit cooler 125 in the stir-cycle mode may reduce energy consumption in particular embodiments. Furthermore, by using relay 115 to indicate the mode of operation to unit cooler 125, electrical power to unit cooler 125 may not be cut during the stir-cycle mode. As a result, the lifespan of unit cooler 125 may be maintained and/or increased in particular embodiments. The unit cooler and its operation will be described in more detail using FIGS. 2 through 4.

Figure 2A:
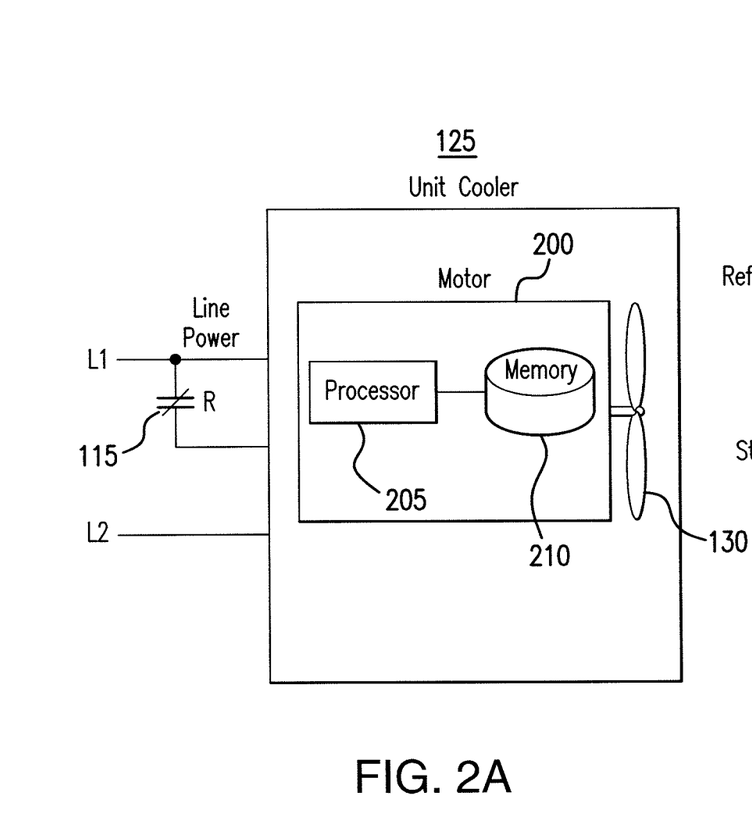
FIG. 2A illustrates an example unit cooler of the refrigeration system of FIG. 1.

FIG. 2A illustrates a unit cooler 125 of the refrigeration system 100 of FIG. 1. As provided in FIG. 2A, unit cooler 125 may include a motor 200, a processor 205, a memory 210, fan 130, and relay 115. Unit cooler 125 further includes electric lines L1 and L2 that supply electric power to unit cooler 125 and/or motor 200. In particular embodiments, relay 115 may be coupled to unit cooler 125 and/or motor 200 to control the operation of unit cooler 125 and/or motor 200. Relay 115 may also be coupled to one of the electric lines L1 and L2.

Motor 200 may rotate fan 130 at various speeds. In particular embodiments, relay 115 may indicate to motor 200 how fast fan 130 should be rotated. In particular embodiments, motor 200 may be an electronically commutated motor. This disclosure contemplates motor 200 being any appropriate type of motor that rotates fan 130. During the refrigeration mode, motor 200 may rotate fan 130 at a first speed such as, for example, 1600 rotations per minute. In certain embodiments, motor 200 may rotate fan 130 at a full speed and/or a max speed during the refrigeration mode. In this manner, cooled air may be quickly circulated throughout a space. This disclosure contemplates motor 200 including any number of parts configured to rotate fan 130. For example, motor 200 may be a motor assembly that includes a rotor, a stator, an air gap, windings, and a commutator.

During the stir-cycle mode, motor 200 may operate fan 130 at two speeds. For example, motor 200 may alternate rotating fan 130 at a second speed, such as for example 800 rotations per minute, and at a third speed, such as for example 0 rotations per minute. This disclosure contemplates motor 200 rotating fan 130 at any appropriate speeds during the stir-cycle mode. In particular embodiments, the second speed may be lower than the first speed at which motor 200 operated during the refrigeration mode. In certain embodiments, the third speed may be lower than the second speed. Motor 200 may rotate fan 130 at the second speed for a first period of time and then rotate fan 130 at the third speed for a second period of time. In this manner, motor 200 may periodically alternate rotating fan 130 at the second speed and at the third speed. As a result, motor 200 may circulate the air in the space even though system 100 is not in the refrigeration mode.

Because relay 115 indicates to motor 200 whether to operate in the refrigeration mode or the stir-cycle mode, electric power may be supplied through L1 and L2 during both the refrigeration mode and the stir-cycle mode. Electric power may be supplied continuously to motor 200 during both the refrigeration mode and the stir-cycle mode. In this manner, electric power may not need to be cut during the stir-cycle mode. As a result, the lifespan of motor 200 may be preserved and/or increased.

Processor 205 may be communicatively coupled to memory 210. Both processor 205 and memory 210 may be configured to control the operation of motor 200. This disclosure contemplates processor 205 and memory 210 being configured to perform any of the functions of unit cooler 125 and/or motor 200 described herein. In particular embodiments, processor 205 and memory 210 may be disposed within a housing of motor 200. In certain embodiments, processor 205 and memory 210 may be disposed within a housing of unit cooler 125. Processor 205 may determine, based on relay 115, whether unit cooler 125 and/or motor 200 should be operating in the refrigeration mode and/or the stir-cycle mode. Based on that determination, processor 205 may control how quickly unit cooler 125 operates and/or how quickly motor 200 rotates fan 130. For example, during the refrigeration mode, processor 205 may control unit cooler 125 and/or motor 200 to rotate fan 130 at a max speed. Then during the stir-cycle mode, processor 205 may control unit cooler 125 and/or motor 200 to alternate between rotating the fan at a second speed and at a third speed. Processor 205 may determine that unit cooler 125 and/or motor 200 has been operating at the second speed for a first period of time and, in response to that determination, operate the unit cooler 125 and/or motor 200 at the third speed for a second period of time. Processor 205 may also determine that unit cooler 125 and/or motor 200 has been operating at the third speed for a second period of time and, in response to that determination, operate the unit cooler 125 and/or motor 200 at the second speed for a first period of time. Processor 205 may be configured to execute software that indicates the speeds at which and periods of time for which motor 200 should rotate fan 130 during the refrigeration mode and the stir-cycle mode in particular embodiments.

Processor 205 may execute software stored on memory 210 to perform any of the functions of unit cooler 125 or motor 200 described herein. Processor 205 may control the operation and administration of unit cooler 125 or motor 200 by processing information received from other components of system 100 such as relay 115. Processor 205 may include any hardware and/or software that operates to control and process information. Processor 205 may be a programmable logic device, a microcontroller, a microprocessor, any suitable processing device, or any suitable combination of the preceding.

Memory 210 may store, either permanently or temporarily, data, operational software, or other information for processor 205. Memory 210 may include any one or a combination of volatile or non-volatile local or remote devices suitable for storing information. For example, memory 210 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 210, a disk, a CD, or a flash drive. In particular embodiments, the software may include an application executable by processor 205 to perform one or more of the functions described herein.

In particular embodiments, motor 200 may include an interface that receives input that can be used to change the speed at which motor 200 rotates fan 130 during the refrigeration mode and/or the stir-cycle mode. For example, the interface may be used to increase or reduce the speed at which motor 200 rotates fan 130 during the refrigeration mode. As another example, the interface may be used to change the two speeds at which motor 200 rotates fan 130 during the stir-cycle mode. The interface may further be used to change the periods of time at which motor 200 rotates fan 130 at the two speeds during the stir-cycle mode. For example, the interface may be used to change the first period of time at which motor 200 rotates fan 130 at a second speed and the second period of time at which motor 200 rotates fan 130 at a third speed during the stir-cycle mode. This disclosure contemplates the interface including any appropriate hardware and/or software to control motor 200 such as, for example, jumper slots and/or dials.

Figure 2B:
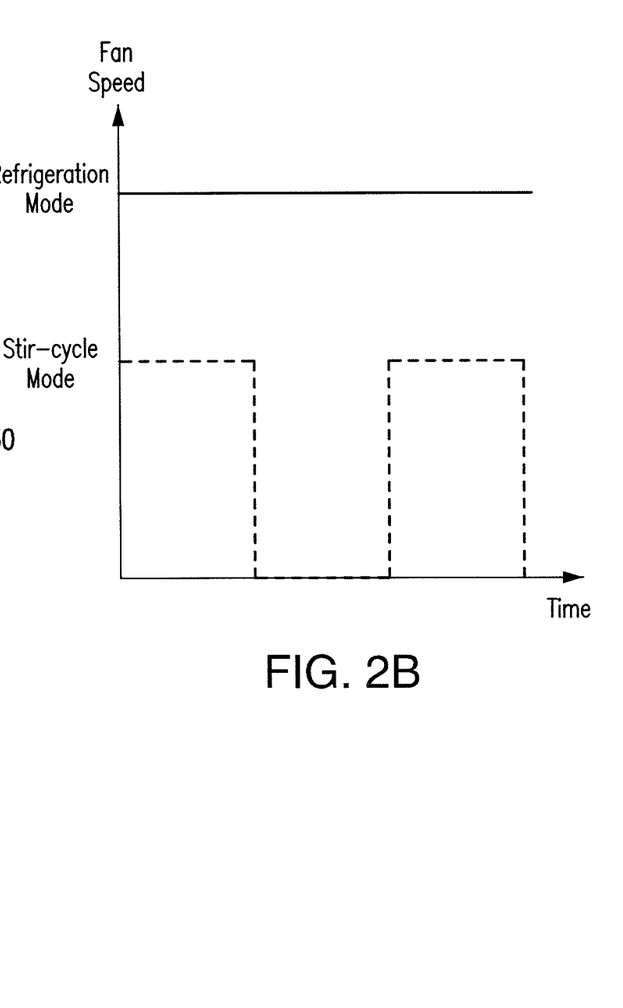
FIG. 2B is a chart illustrating fan speeds of the unit cooler of FIG. 2A.

FIG. 2B is a chart illustrating fan speeds of the unit cooler 125 of FIG. 2A. As illustrated in FIG. 2B, during the refrigeration mode, motor 200 may rotate fan 130 at a first speed such as, for example, a max speed and/or a full speed. Then in the stir-cycle mode, motor 200 may rotate fan 130 at two different speeds. Motor 200 may rotate fan 130 at a second speed for a first period of time and then a third speed for a second period of time. In particular embodiments, during the refrigeration mode motor 200 may rotate fan 130 at 1600 rotations per minute. Then in the stir-cycle mode, motor 200 may rotate fan 130 at 800 rotations per minute for one minute and then zero rotations per minute for three minutes. Motor 200 may alternate between rotating fan 130 at 800 rotations per minute and zero rotations per minute during the stir-cycle mode. In this manner, motor 200 may prevent and/or reduce the amount of localized hot spots in the space during the stir-cycle mode.

Figure 3A:
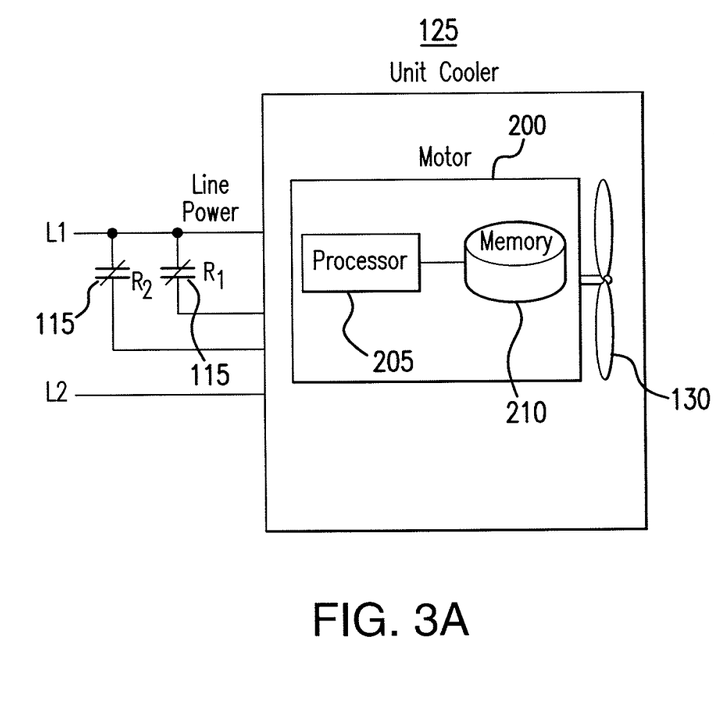
FIG. 3A illustrates an example unit cooler of the refrigeration system of FIG. 1.

FIG. 3A illustrates a unit cooler 125 of the refrigeration system 100 of FIG. 1. As provided in FIG. 3A, unit cooler 125 may include at least two relays 115, R1 and R2. In particular embodiments, by controlling the states of R1 and R2, unit cooler 125 and/or motor 200 may implement more than one stir-cycle mode. For example, if both R1 and R2 are open, unit cooler 125 and/or motor 200 may operate in a refrigeration mode. As another example, if both R1 and R2 are closed, unit cooler 125 and/or motor 200 may operate in a first stir-cycle mode. Furthermore, if R1 is open and R2 is closed, unit cooler 125 and/or motor 200 may operate in a second stir-cycle mode. This disclosure contemplates unit cooler 125 and/or motor 200 operating in any mode based on any appropriate combination of opening and closing of R1 and R2.

Figure 3B:
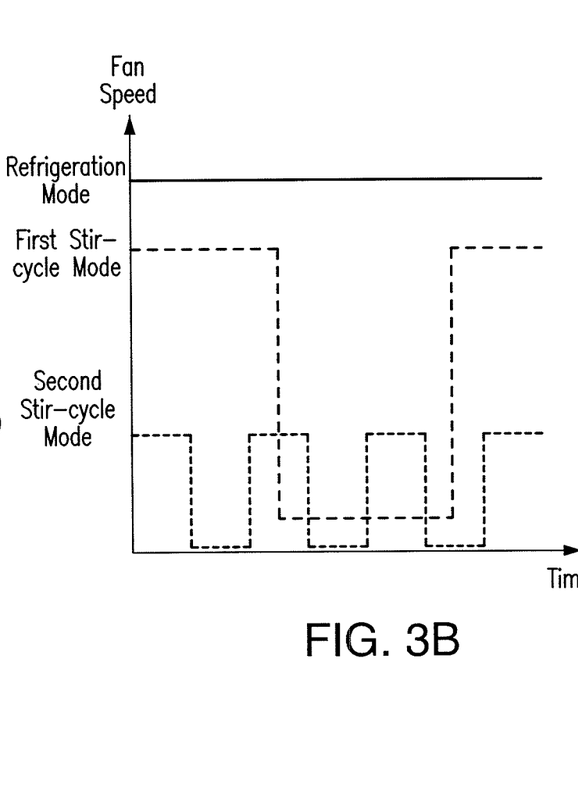
FIG. 3B is a chart illustrating fan speeds of the unit cooler of FIG. 3A.

In certain embodiments, unit cooler 125 and motor 200 may rotate fan 130 differently during the first stir-cycle mode than in the second stir-cycle mode. For example, as illustrated in FIG. 3B, unit cooler 125 and/or motor 200 may rotate fan 130 at a second speed and at a third speed during the first stir-cycle mode. The second speed may be maintained for a first period of time and the third speed may be maintained for a second period of time. During the second stir-cycle mode, unit cooler 125 and/or motor 200 may rotate fan 130 at a fourth speed and at a fifth speed. The fourth speed and/or the fifth speed may be different from the second and/or third speeds of the stir-cycle mode. The fourth speed may be maintained for a third period of time and the fifth speed may be maintained for a fourth period of time.

In the illustrated example of FIG. 3B, unit cooler 125 and/or motor 200 may rotate fan 130 at the second speed and the third speed during the first stir-cycle mode. Both the second speed and the third speed may be less than the fan speed during the refrigeration mode. During the second stir-cycle mode, unit cooler 125 and/or motor 200 may rotate fan 130 at the fourth speed and at the fifth speed. Both the fourth speed and the fifth speed may be less than the second speed. This disclosure contemplates unit cooler 125 including any number of relays 115 and implementing any number of stir-cycle modes. Furthermore, this disclosure contemplates unit cooler 125 and/or motor 200 rotating fan 130 at any appropriate speeds during the refrigeration mode and/or stir-cycle modes.

Figure 4:
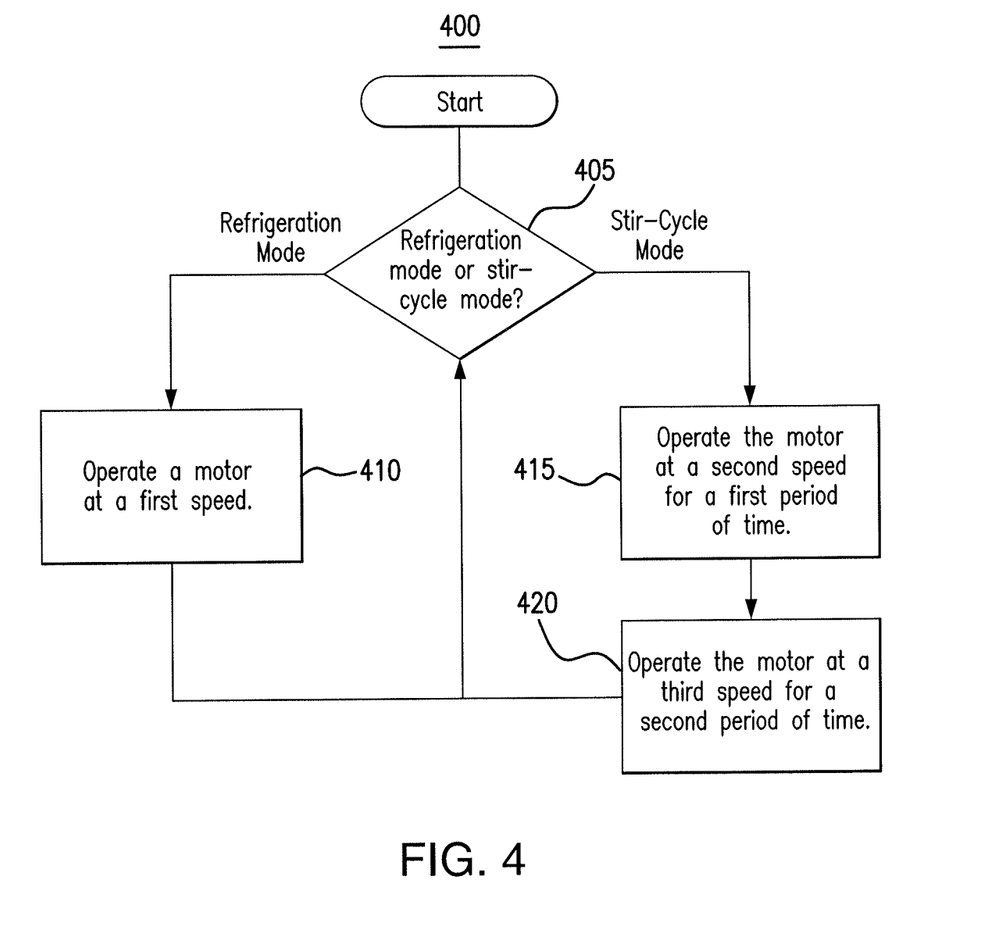
FIG. 4 is a flowchart illustrating a method of operating a motor of the system of FIG. 1.

FIG. 4 is a flowchart illustrating a method 400 of operating a motor 200 of the system 100 of FIG. 1. In particular embodiments, processor 205 may perform method 400. This disclosure further contemplates unit cooler 125, motor 200, relay 115 and/or a thermostat performing method 400.

In step 405, processor 205 may determine whether system 100 should be operating in the refrigeration mode or stir-cycle mode. In particular embodiments, processor 205 may make this determination based on a thermostat or a relay 115. For example, if the thermostat measures a temperature of a space to be greater than or equal to a set point temperature, processor 205 may determine that system 100 should be operating in the refrigeration mode. Otherwise, processor 205 may determine that system should be operating in the stir-cycle mode.

If processor 205 determines that system 100 should be operating in the refrigeration mode, processor 205 may operate a motor at a first speed in step 410. In particular embodiments, the first speed may be a max speed and/or a full speed. In this manner, the motor may quickly circulate air to cool the space. Processor 205 may continue operating the motor at the first speed until processor 205 determines that system 100 should be operating in the stir-cycle mode.

If processor 205 determines that system 100 should be operating in the stir-cycle mode in step 405, processor 205 may operate the motor at a second speed for a first period of time in step 415. In particular embodiments, the second speed may be less than the first speed of the refrigeration mode. Processor 205 may then operate the motor at a third speed for a second period of time in step 420. In particular embodiments, the third speed may be less than the second speed. In certain embodiments, the third speed may be zero rotations per minute. Processor 205 may operate the motor at the third speed at the end of the first period of time. In particular embodiments, processor 205 may alternate operating the motor at the second speed and at the third speed until processor 205 determines that system 100 should be operating in the refrigeration mode.

In certain embodiments, the first speed, second speed, third speed, first period of time and second period of time may be adjusted using an interface such as, for example, jumper slots and/or dials. For example, first speed, second speed, and third speed may be increased and/or decreased. As another example, first period of time and/or second period of time may be increased and/or decreased.

Modifications, additions, or omissions may be made to method 400 depicted in FIG. 4. Method 400 may include more, fewer, or other steps. For example, steps may be performed in parallel or in any suitable order. While discussed as processor 205 performing the steps, any suitable component of system 100, such as unit cooler 125 and/or motor 200 for example, may perform one or more steps of the method.

Although this disclosure illustrates and describes refrigeration system 100 including certain elements, it is appreciated that the concepts described herein may be applied to any type of refrigeration system that operates a fan to cool a space. For example, the refrigeration system may include any number of compressors. It is also appreciated that the concepts described herein may be applied generally to any system that operates a motor.

Modifications, additions, or omissions may be made to the present disclosure without departing from the scope of the invention. For example, the components of system 100 may be integrated or separated.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system comprising:
    a condensing unit configured to condense refrigerant:
    a valve configured to control the flow of the refrigerant from the condensing unit to a unit cooler; and
    the unit cooler comprising a fan and configured to operate in a refrigeration mode and a stir-cycle mode, wherein:
        during the refrigeration mode, the fan is configured to operate at a first speed;
        during the stir-cycle mode, the fan is configured to operate at a second speed for a first period of time and at a third speed for a second period of time;
        the second speed is slower than the first speed;
        the third speed is non-zero and slower than the second speed; and
        electric power is supplied to the unit cooler for the entire duration of the refrigeration mode and the stir-cycle mode.

2. The system of claim 1, wherein the unit cooler further comprises an interface configured to receive input that changes one or more of the first speed, the second speed, the first period of time, and the second period of time.

3. The system of claim 1, wherein the third speed is zero rotations per minute.

4. The system of claim 1, wherein:
    the unit cooler comprises a housing and a processor disposed within the housing; and
    the processor is configured to:
        determine whether the unit cooler should be operating in the refrigeration mode or the stir-cycle mode; and
        change the speed at which the fan operates based on the determination whether the unit cooler should be operating in the refrigeration mode or the stir-cycle mode.

5. The system of claim 4, wherein the processor is further configured to:
    determine, during the stir-cycle mode, that the fan has operated at the second speed for the first period of time;
    in response to the determination that the fan has operated at the second speed for the first period of time, operate the fan at the third speed for the second period of time;
    determine, during the stir-cycle mode, that the fan has operated at the third speed for the second period of time; and
    in response to the determination that the fan has operated at the third speed for the second period of time, operate the fan at the second speed for the first period of time.

6. The system of claim 1, wherein:
    the fan is further configured to operate at a fourth speed for a third period of time and at a fifth speed for a fourth period of time during a second stir-cycle mode;
    the fourth speed is different from the second speed; and
    the fifth speed is less than the fourth speed.

7. The system of claim 1, further comprising a switch configured to indicate to the unit cooler whether the unit cooler should be operating in the refrigeration mode or the stir-cycle mode, wherein the switch is controlled by a thermostat.

8. The system of claim 1, wherein, during the stir-cycle mode, the fan is configured to alternate between operating at the second speed for the first period of time and operating at the third speed for the second period of time.

9. An apparatus comprising:
    a fan, and
    a motor assembly coupled to the fan and configured to:
        during a first mode, rotate the fan at a first speed during a first mode;

during a second mode, rotate the fan at a second speed for a first period of time and at a third speed for a second period of time during a second mode;

wherein:

the second speed is slower than the first speed;

the third speed is non-zero and slower than the second speed; and electric power is supplied to the motor assembly for the entire duration of the first mode and the second mode.

10. The apparatus of claim 9, wherein:

the motor assembly further comprises an interface configured to receive input that changes one or more of the first speed, the second speed, the first period of time, and the second period of time.

11. The apparatus of claim 9, wherein the third speed is zero rotations per minute.

12. The apparatus of claim 9, wherein:

the motor assembly comprises a housing and a processor disposed within the housing; and the processor is configured to:

determine whether the motor assembly should be operating in the first mode or the second mode; and change the speed at which the motor assembly rotates the fan based on the determination whether the motor assembly should be operating in the first mode or the second mode.

13. The apparatus of claim 12, wherein the processor is further configured to:

determine, during the second mode, that the motor assembly has rotated the fan at the second speed for the first period of time;

in response to the determination that the motor assembly has rotated the fan at the second speed for the first period of time, instruct the motor assembly to rotate the fan at the third speed for the second period of time;

determine, during the second mode, that the motor assembly has rotated the fan at the third speed for the second period of time; and in response to the determination that the motor assembly has rotated the fan at the third speed for the second period of time, instruct the motor assembly to rotate the fan at the second speed for the first period of time.

14. The apparatus of claim 9, wherein:

the motor assembly is further configured to rotate the fan at a fourth speed for a third period of time and at a fifth speed for a fourth period of time during a third mode;

the fourth speed is different from the second speed; and the fifth speed is less than the fourth speed.

15. The apparatus of claim 9, further comprising a switch configured to indicate to the motor assembly whether the motor assembly should be operating in the first mode or the second mode, wherein the switch is controlled by a thermostat.

16. The apparatus of claim 9, wherein, during the second mode, the motor assembly is configured to alternate between rotating the fan at the second speed for the first period of time and rotating the fan at the third speed for the second period of time.

17. A method comprising:

determining, by a processor, whether a motor should be operating in a first mode or a second mode;

in response to a determination that the motor should be operating in the first mode, operating the motor at a first speed;

in response to a determination that the motor should be operating in the second mode, operating the motor at a second speed for a first period of time and at a third speed for a second period of time, wherein:

the second speed is slower than the first speed;

the third speed is non-zero and slower than the second speed; and electric power is supplied to the motor for the entire duration of the first mode and the second mode.

18. The method of claim 17, wherein the motor further comprises an interface configured to receive input that changes one or more of the first speed, the second speed, the first period of time, and the second period of time.

19. The method of claim 17, wherein the third speed is zero rotations per minute.

20. The method of claim 17, wherein the motor comprises a housing and the processor is disposed within the housing.

21. The method of claim 17, further comprising:

determining, by the processor, whether the motor should be operating in a third mode;

in response to a determination that the motor should be operating in the third mode, operating the motor at a fourth speed for a third period of time and at a fifth speed for a fourth period of time, wherein:

the fourth speed is different from the second speed; and the fifth speed is less than the fourth speed.

22. The method of claim 21, further comprising:

determining, by the processor, during the second mode, that the motor has operated at the second speed for the first period of time;

in response to the determination that the motor has operated at the second speed for the first period of time, operating the motor at the third speed for the second period of time;

determine, during the second mode, that the motor has operated at the third speed for the second period of time; and in response to the determination that the motor has operated at the third speed for the second period of time, operating the motor at the second speed for the first period of time.

23. The method of claim 17, the motor comprises a switch configured to indicate whether the motor should be operating in the first mode or the second mode, wherein the switch is controlled by a thermostat.

24. The method of claim 17, further comprising, during the second mode, alternating between operating the motor at the second speed for the first period of time and operating the motor at the third speed for the second period of time.

* * * * *